United States Patent
Bellows et al.

(10) Patent No.: US 8,316,207 B2
(45) Date of Patent: Nov. 20, 2012

(54) ASSIGNING EFFICIENTLY REFERENCED GLOBALLY UNIQUE IDENTIFIERS IN A MULTI-CORE ENVIRONMENT

(75) Inventors: Greg H. Bellows, Austin, TX (US); Jason N. Dale, Austin, TX (US); Brian H. Horton, Pflugerville, TX (US); Joaquin Madruga, Round Rock, TX (US)

(73) Assignee: International Business Machines Corporation, Armonk, NY (US)

( * ) Notice: Subject to any disclaimer, the term of this patent is extended or adjusted under 35 U.S.C. 154(b) by 291 days.

(21) Appl. No.: 12/649,542

(22) Filed: Dec. 30, 2009

(65) Prior Publication Data

US 2011/0161618 A1 Jun. 30, 2011

(51) Int. Cl.
*G06F 12/02* (2006.01)
(52) U.S. Cl. .................. 711/202; 711/E12.014
(58) Field of Classification Search .......... None
See application file for complete search history.

(56) References Cited

U.S. PATENT DOCUMENTS

| | | | |
|---|---|---|---|
| 2004/0064654 | A1 | 4/2004 | Willis et al. |
| 2004/0114589 | A1* | 6/2004 | Alfieri et al. ........ 370/389 |
| 2004/0215918 | A1 | 10/2004 | Jacobs et al. |
| 2006/0230217 | A1 | 10/2006 | Moll |
| 2007/0033318 | A1 | 2/2007 | Gilday et al. |
| 2007/0283037 | A1 | 12/2007 | Burns |
| 2009/0265306 | A1 | 10/2009 | Barsness et al. |

FOREIGN PATENT DOCUMENTS

EP 0767424 A2 4/1997

OTHER PUBLICATIONS

International Search Report dated Apr. 7, 2011.

* cited by examiner

*Primary Examiner* — Edward Dudek, Jr.
*Assistant Examiner* — Ryan Dare
(74) *Attorney, Agent, or Firm* — Yudell Isidore Ng Russell PLLC (57) ABSTRACT

A mechanism is provided in a multi-core environment for assigning a globally unique core identifier. A Power PC® processor unit (PPU) determines an index alias corresponding to a natural index to a location in local storage (LS) memory. A synergistic processor unit (SPU) corresponding to the PPU translates the natural index to a first address in a core's memory, as well as translates the index alias to a second address in the core's memory. Responsive to the second address exceeding a physical memory size, the load store unit of the SPU truncates the second address to a usable range of address space in systems that do not map an address space. The second address and the first address point to the same physical location in the core's memory. In addition, the aliasing using index aliases also preserves the ability to combine persistent indices with relative indices without creating holes in a relative index map.

18 Claims, 5 Drawing Sheets

ASSIGNING EFFICIENTLY REFERENCED GLOBALLY UNIQUE IDENTIFIERS IN A MULTI-CORE ENVIRONMENT

BACKGROUND

The present application relates generally to distributed memory management systems and more specifically to mechanisms for assigning efficiently referenced globally unique identifiers in a multi-core environment.

In multi-core environments, it is often necessary to manage independent workloads or pieces of workloads across several cores. In order to facilitate cross-core management of workloads, a host program tracks how the cores are allocated to each workload. Moreover, it may be necessary for the cores to identify one another for communication purposes. In this regard, there may be a considerable number of memory address spaces to coordinate such communications between the various cores, as is the case with Cell Broadband Engine Architecture (CBEA).

A typical CBEA includes at least one Power PC® processor element (PPE) core and 8 Synergistic Processor Element (SPE) cores each with 256 KB fast local memory per SPE, as well as a globally coherent direct memory access (DMA) engine for transferring data between local memories and the shared system memory. The management of these resources in a global manner requires system-wide unique identifiers. For each core to identify other cores, the identifiers that are used must be translated into useful data (e.g., a structure, a pointer). This translation may involve looking up data that is associated with a given identifier, as by using an index into a memory array. In the case of indexed memory arrays, there are a number of indexing mechanisms that can be implemented. One way is to employ a globally unique index number (i.e., absolute index) to identify each particular core in the multi-core environment. Another way is to employ a relative index that is unique to just a subset of cores.

However, the translation of these types of indexes into data requires considerable overhead. Relative indexes may not be globally unique across separate sets of cores. Thus, the host or master managing these resources requires additional information to make each identifier unique. For example, in the case of separate sets of cores, such additional information could identify the particular set of cores to which the identifier is associated. In addition, sharing identifier information requires translation into an identifier that is recognized by the recipient, which can prove to be inefficient.

While the use of absolute indexes remedies the global uniqueness issues present in relative indexing, the implementation of absolute indexing requires the entire address table to be available wherever the indices are used. This consumes an unnecessary amount of memory resources, especially if memory space is constrained within the multi-core system. To obviate the need to have an entire address table stored in each location where the absolute indices are used, one method to reduce memory in this scenario is to (i) only make a contiguous portion of the entire globally-unique table available in each location and (ii) use an adjustment factor on the index to make it relative. However, like the above scenario involving relative indexing, the adjustment factor adds to the translation overhead.

In addition to the inefficiencies associated with absolute and relative indexing, static indices that persist across all sets of cores (e.g., a master's identifier) can create gaps in the continuity of the indexes used in the tables. The handling of these gaps in the indexing can be handled in a number of ways, but none of these ways are optimal. For example, empty entries can be added to fill the holes in the table, which wastes memory space. Another option is to "special-case" the holes in the indexing, which adds additional steps in the processing of the indices.

SUMMARY

In one illustrative embodiment, a method, in a multi-core environment, for assigning a globally unique core identifier to a processor unit (PU). The illustrative embodiments determine, using a Power PC® processor unit (or principal processor unit) (PPU), an index alias corresponding to a natural index, wherein a synergistic processor unit (SPU) corresponding to the PPU translates the natural index to a first address in a core's memory, as well as translates the index alias to a second address in the core's memory. The determining of the index alias includes the PPU determining a total available memory size of a local storage (LS) of a processor core that stores an address lookup table. The PPU also determines a fixed size of a table element of the address lookup table within the total available memory of the LS. The PPU determines an aliasing factor, wherein the aliasing factor is a quotient of the total available memory and the fixed size of the table element. If the PPU determines that more than one distinct identifier (ID) to a same PU is required, the PPU then increments the natural index by the aliasing factor. The PPU communicates the index alias to its corresponding SPU. The PPU or SPU translates the index alias to the second address such that the second address and the first address point to the same physical location in the core's memory.

In other illustrative embodiments, a computer program product comprising a computer useable or readable medium having a computer readable program is provided. The computer readable program, when executed on a computing device, causes the computing device to perform various ones, and combinations of, the operations outlined above with regard to the method illustrative embodiment.

In yet another illustrative embodiment, a system/apparatus is provided. The system/apparatus may comprise one or more processors and a memory coupled to the one or more processors. The memory may comprise instructions which, when executed by the one or more processors, cause the one or more processors to perform various ones, and combinations of, the operations outlined above with regard to the method illustrative embodiment.

These and other features and advantages of the present invention will be described in, or will become apparent to those of ordinary skill in the art in view of, the following detailed description of the example embodiments of the present invention.

BRIEF DESCRIPTION OF THE DRAWINGS

The invention, as well as a preferred mode of use and further objectives and advantages thereof, will best be understood by reference to the following detailed description of illustrative embodiments when read in conjunction with the accompanying drawings, wherein.

DETAILED DESCRIPTION

The illustrative embodiments provide a mechanism for assigning efficiently referenced globally unique identifiers in a multi-core environment. The mechanism has the benefits of both relative and absolute indexing, but without the inefficiency of translation overhead or memory waste.

Figure 1:
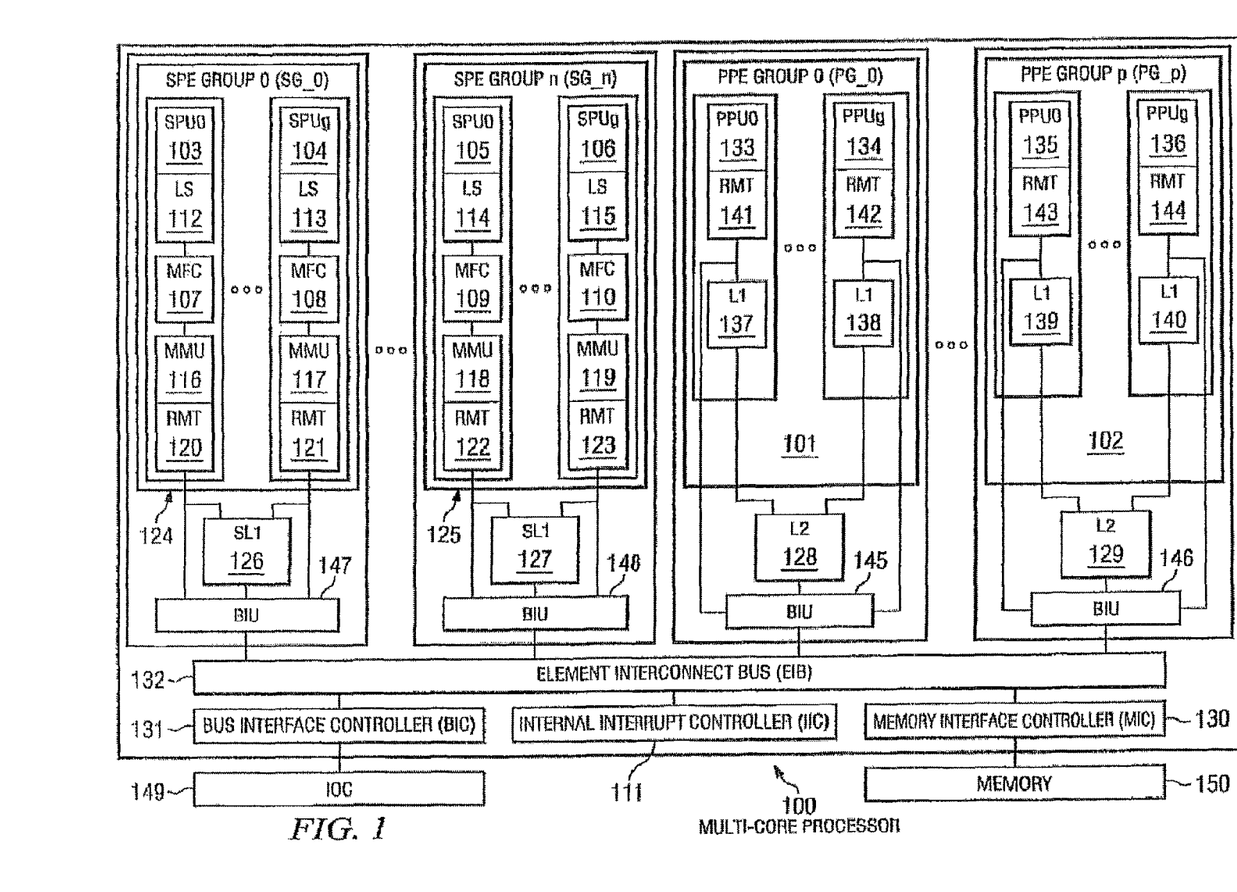
FIG. 1 depicts an exemplary diagram of a heterogenous multi-core processor in which aspects of the illustrative embodiments may be implemented in accordance with an illustrative embodiment.

With reference now to the figures and in particular with reference to FIG. 1, exemplary diagrams of data processing environments are provided in which illustrative embodiments of the present invention may be implemented. It should be appreciated that FIG. 1 is only exemplary and is not intended to assert or imply any limitation with regard to the environments in which aspects or embodiments of the present invention may be implemented. Many modifications to the depicted environments may be made without departing from the spirit and scope of the present invention.

With reference now to the figures and in particular with reference to FIG. 1, an exemplary diagram of a heterogeneous multi-core processor is shown in which aspects of the illustrative embodiments may be implemented in accordance with an illustrative embodiment. This example of a heterogeneous multi-core processor is compliant with the Cell Broadband Engine Architecture (CBEA) jointly developed by IBM, Sony Computer Entertainment Inc., and Toshiba. Cell Broadband Engine is a trademark of Sony Computer Entertainment Corporation. Multi-core processor 100 may consist of a single chip, a multi-chip module (or modules), or multiple single-chip modules on a motherboard or other second-level package, depending on the technology used and the cost/performance characteristics of the intended design point directed toward distributed processing targeted for media-rich applications such as game consoles, desktop systems, and servers.

Logically, multi-core processor 100 defines four separate types of functional components: Power PC® processor element (also referred herein as principal processor element) (PPE) 101 or 102, synergistic processor units (SPU) 103, 104, 105, or 106, memory flow controller (MFC) 107, 108, 109, or 110, and internal interrupt controller (IIC) 111. The computational units in multi-core processor 100 are PPEs 101 and 102 and SPUs 103, 104, 105, and 106. Each of SPUs 103, 104, 105, and 106 has dedicated local storage (LS) 112, 113, 114, or 115, a dedicated MFC 107, 108, 109, or 110 with its associated memory management unit (MMU) 116, 117, 118, or 119, and replacement management table (RMT) 120, 121, 122, or 123, respectively. The combination of these components is referred to as SPU element (SPE) group 124 or 125.

Multi-core processor 100 depicts SPE groups 124 and 125 that share a single SL1 cache 126 and 127, respectively. An SL1 cache is a first-level cache for direct memory access transfers between local storage and main storage. PPE groups 101 and 102 share single second-level (L2) caches 128 and 129, respectively. While caches are shown for the SPE groups 124 and 125 and PPE groups 101 and 102, they are considered optional in the CBEA. Also included in FIG. 1 are two controllers typically found in a processor: memory interface controller (MIC) 130 and bus interface controller (BIC) 131. MIC 130 provides access to memory 150 for multi-core processor 100. BIC 131 provides an input/output interface to input/output controller (IOC) 149 for multi-core processor 100. Connecting the various units within the processor is element interconnect bus (BIB) 132. Since the requirements for the MIC 130, BIC 131, and EIB 132 vary widely between implementations, the definition for these units is beyond the scope of the CBEA.

Multi-core processor 100 may include multiple groups of Power PC® processor elements (PPE groups), such as PPE group 101 or 102, and multiple groups of synergistic processor elements (SPE groups), such as SPE group 124 or 125. Hardware resources may be shared between units within a group. However, SPE groups 124 and 125 and PPE groups 101 and 102 appears to software as independent elements.

Each of SPUs 103, 104, 105, and 106 in SPE groups 124 and 125 has its own local storage area 112, 113, 114, or 115 and dedicated MFC 107, 108, 109, or 110 that includes an associated MMU 116, 117, 118, or 119, which can hold and process memory-protection and access-permission information.

Multi-core processor 100 includes one or more of PPE group 101 or 102. PPE groups 101 and 102 consist of 64-bit Power PC® processor units (also referred herein as principal processor units) (PPUs) 133, 134, 135, and 136 with associated L1 caches 137, 138, 139, and 140, respectively. Multi-core processor 100 system includes a vector multimedia extension unit (not shown) in the PPE groups 101 and 102. PPE groups 101 and 102 also contain replacement management table (RMT) 141, 142, 143, and 144 and bus interface unit (BIU) 145 and 146, respectively. BIUs is 145 and 146 connect PPE groups 101 or 102 to the EIB 132. BIUs 147 and 148 connect RMTs 120, 121, 122, and 123 to EIB 132.

PPE groups 101 and 102 are general-purpose processing units, which can access system management resources, such as the memory-protection tables, for example. Hardware resources defined in the CBEA are mapped explicitly to the real address space as seen by PPE groups 101 and 102. Therefore, any PPE groups 101 and 102 may address any of these resources directly by using an appropriate effective address value. A primary function of PPE groups 101 and 102 is the management and allocation of tasks for the SPE groups 124 and 125 in a system.

Multi-core processor 100 includes one or more SPUs 103, 104, 105, or 106. SPUs 103, 104, 105, and 106 are less complex computational units than PPE groups 101 and 102, in that they do not perform any system management functions. SPUs 103, 104, 105, and 106 have a single instruction multiple data (SIMD) capability and typically process data and initiate any required data transfers, subject to access properties set up by PPE groups 101 and 102, in order to perform their allocated tasks.

SPUs 103, 104, 105, and 106 enable applications that require a higher computational unit density and may effectively use the provided instruction set. A significant number of SPUs 103, 104, 105, and 106 in a system, managed by PPE group 101 or 102, allow for cost-effective processing over a wide range of applications.

MFCs 107, 108, 109, and 110 are the data transfer engines. MFCs 107, 108, 109, and 110 provide the primary method for data transfer, protection, and synchronization between main storage and the local storage. MFCs 107, 108, 109, and 110 commands describe the transfer to be performed. MFCs 107, 108, 109, and 110 perform these data transfer operations in as fast and as fair a manner as possible, thereby maximizing the overall throughput of multi-core processor 100.

Commands that transfer data are referred to as MFC direct memory access commands. These commands are converted into direct memory access transfers between the local storage domain and main storage domain. Each of MFCs 107, 108, 109, and 110 may typically support multiple direct memory access transfers at the same time and may maintain and process multiple MFC commands.

In order to accomplish this, MFCs 107, 108, 109, and 110 maintain and process queues of MFC commands. Each of MFCs 107, 108, 109, and 110 provides one queue for the associated SPU 103, 104, 105, or 106, known as MFC SPU command queue, and one queue for other processors and devices, known as MFC proxy command queue. Logically, a set of MFC queues is always associated with each SPU 103, 104, 105, or 106 in multi-core processor 100, but some implementations of the architecture may share a single physical MFC between multiple SPUs. In such cases, all the MFC facilities appear to software as independent for each SPU 103, 104, 105, or 106.

Each MFC direct memory access data transfer command request involves both a local storage address (LSA) and an effective address (EA). The local storage address can directly address only the local storage area of its associated SPU 103, 104, 105, or 106. The effective address has a more general application, in that it can reference main storage, including all the SPU local storage areas, if they are aliased into the real address space. Address management and address aliasing shall be discussed further in reference to FIGS. 2 and 3.

MFCs 107, 108, 109, and 110 present two types of interfaces: one to the SPUs 103, 104, 105, and 106 and another to all other processors and devices in a processing group.

SPU channel: The SPUs 103, 104, 105, and 106 use a channel interface to control MFCs 107, 108, 109, and 110. In this case, code running on SPUs 103, 104, 105, and 106 can only access the MFC SPU command queue for that SPU 103, 104, 105, or 106.

Memory-Mapped Register: Other processors and devices control MFC 107, 108, 109, and 110 by using memory-mapped registers. It is possible for any processor and device in the system to control MFCs 107, 108, 109, or 110 and to issue MFC proxy command requests on behalf of SPU 103, 104, 105, or 106.

MFCs 107, 108, 109, and 110 also support bandwidth reservation and data synchronization features.

IIC 111 manages the priority of the interrupts presented to PPE groups 101 and 102. The main purpose of IIC 111 is to allow interrupts from the other components in the processor to be handled without using the main system interrupt controller. IIC 111 is really a second level controller. IIC 111 is intended to handle all interrupts internal to a multi-core processor 100 or within a multiprocessor system of multi-core processor 100. The system interrupt controller will typically handle all interrupts external to multi-core processor 100.

In a multi-core system, software checks IIC 111 to determine if the interrupt was sourced from an external system interrupt controller. IIC 111 is not intended to replace the main system interrupt controller for handling interrupts from all I/O devices.

Those of ordinary skill in the art will appreciate that the hardware in FIG. 1 may vary depending on the implementation. Other internal hardware or peripheral devices, such as flash memory, equivalent non-volatile memory, or optical disk drives and the like, may be used in addition to or in place of the hardware depicted in FIG. 1. Also, the processes of the illustrative embodiments may be applied to a multiprocessor data processing system, other than the SMP system mentioned previously, without departing from the spirit and scope of the present invention.

Figure 2:
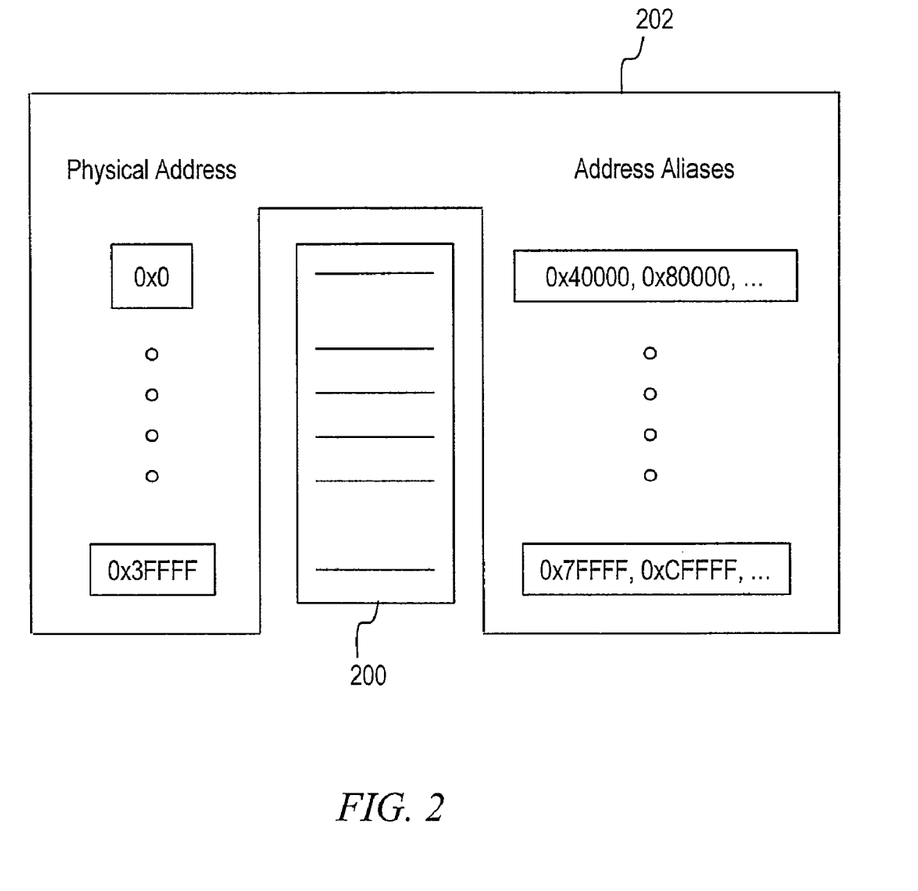
FIG. 2 depicts an exemplary address diagram of a synergistic processor unit's (SPU's) local storage (LS) in which aspects of the illustrative embodiments may be implemented.

FIG. 2 depicts an exemplary address diagram 200 of SPU local storage (LS). In small memory systems that do not use memory translation, such as SPU 103, 104, 105, and 106 on the CBEA, the address space will wrap beyond a certain address size. This is due to the fact that addressing beyond this exemplary address range/size on the exemplary LS causes address truncation back into its usable range/size. Although the truncation in the current embodiment occurs entirely by the SPU hardware (i.e., load store unit (not shown)), it is also possible in other embodiments for the program executed by the SPU to perform the truncation by moding the incoming aliased address by the address size or the index by an aliasing factor. This wrapping of the address space facilitates address aliasing, where multiple addresses can point to a same location/cell in memory. For example, each SPU 103, 104, 105, and 106 of an exemplary CBEA has a local storage (LS) having 256 k of storage capacity defining a particular address space. Exemplary address diagram 200 of LS illustrates how a range of actual physical addresses (e.g., physical addresses 0x0 through entry 0x3FFFF) of memory map 202 of LS are mapped to address aliases (e.g., addresses aliases 0x40000, 0x80000, et seq. through 0x7FFFF, 0xCFFFF, et seq.). Since the SPU's local storage (LS) size is capped at 40000, a base address of, e.g., 0x0, will be aliased every x40000 (hence, 0x40000, 0x80000, etc.).

The present invention utilizes the address wrapping mechanism of address diagram 200 to generate globally unique handles (indices or offsets) that map to the same relative location in an LS. With respect to indices or offsets, the mechanism is similarly implemented as earlier shown in FIG. 2, except that the use of index and offset aliases results in a relative value that is portable between address spaces. Thus, multiple, unique handles may exist that map to the same relative location in a lookup table, as shall be described below with reference to FIG. 3.

Figure 3:
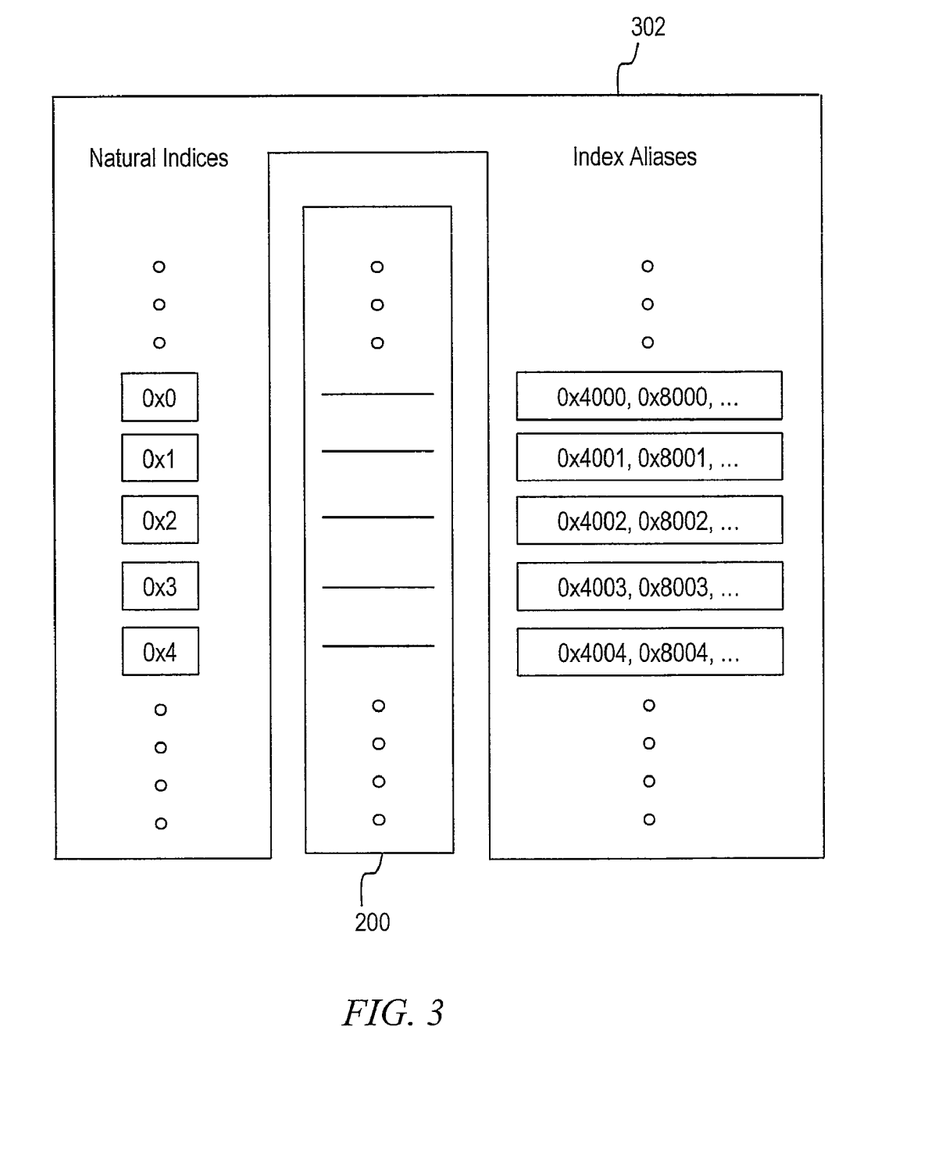
FIG. 3 depicts an exemplary SPU local storage (LS) model employing index aliasing in accordance with an illustrative embodiment.

FIG. 3 depicts an index aliasing lookup table 300 in accordance with an illustrative embodiment. Indices are created by incrementing an address by a predetermined fixed offset, which, if incremented beyond a certain address limit, can also wrap the address space of LS 200. If the fixed size increment is chosen properly, the address space wrapping can result in multiple, different indices referring to the same object in memory. In this regard, the fixed offset divides evenly into the available memory space of address space 200 and entries are naturally aligned. By dividing the total memory size of the address space 200 of LS by the fixed table entry size, the lowest factor that can be used for aliasing is determined. Moreover, the addition of this lowest factor to any index provides the index alias to the same location in the memory space. The following relationship can be used to calculate an index alias for a given index:

index alias=(memory_size/table_entry_size)+index

FIG. 3 depicts an exemplary SPU local storage (LS) model 300 employing index aliasing in accordance with an illustrative embodiment. Similar to address diagram 200 described earlier, an index aliasing table 302 relates each natural index (e.g., 0x0, 0x1, 0x2, 0x3, 0x4) of address space 200 of LS to its respective index alias(es) (e.g., 0x4000, 0x4001, 0x4002, 0x4003, 0x4004). The natural index and its respective index alias(es) correspond to a particular memory location in address space 200 of LS.

For exemplary purposes only, assume that LS address space 200 contains a table of sixteen (0x10) byte elements in a CBEA environment. Dividing total memory (e.g., LS total memory is 256 k) by the fixed element size, sixteen, results in a lowest aliasing factor of 16384 (i.e., 0x4000). As shown in FIG. 3, adding this lowest aliasing factor to a given index results in an index alias that points to the same table location. Moreover, it should be recognized that is possible to employ a larger aliasing factor to support increases in memory size, provided that a multiple of the calculated lowest aliasing factor is used.

In addition to the example provided within the context of FIG. 3, another example shall be presented to further describe the idea of index aliasing. For exemplary purposes only, assume that a portion of data, named "data[25]" requires a unique alias identifier. "Data[25]" represents the $26^{th}$ element of a 0-based data array. From an addressing perspective, "data[25]" refers to the particular data element that is located twenty-five (0x19) elements in from the base of the data. If data is based at address 0x10000 and each element has a size of 0x100, then the $26^{th}$ element has a base address of 0x10000+(0x19*0x100), which is equivalent to 0x11900. Thus, array indexing translates into an address in LS memory. If the address exceeds the range of addressable LS memory, address truncation occurs and the address will "wrap" such that the address will point to the same cell as the unaliased address or previously aliased addresses. Continuing with this example by applying the relationship expressed earlier and assuming that the SPU's LS memory size is 0x40000, the first index alias is:

(0x40000)/0x100)+0x19=0x419 (i.e., index alias ID is 1049).

Index alias ID 1049 is an alias for data element 25.

To verify the above index aliasing, a verification of the address being pointed to in LS can be made:

data[1049]=0x10000+(0x419*0x100)=0x51900; where:
i. data[1049] is the alias of data[25];
ii. 0x10000 is the base address of the data;
iii. 0x419 is the first alias;
iv. 0x100 is the size of each element; and
v. 0x51900 is the address of the alias that is to be truncated since the total size of the LS memory is 0x40000

Truncating the address caused by aliasing for the LS memory size of 0x40000, yields 0x11900 (i.e., 0x51900−0x40000=0x11900), which is the same address associated with data[25]. Thus, index aliasing can provide two or more global identifiers (IDs) (i.e., 25 and 1049) that refer to the same table lookup location. Both ID 25 and ID 1049 can be used to index the $26^{th}$ element of their respective tables, while maintaining globally unique identifiers.

In addition to the idea that multiple identifiers can be assigned to a memory location that are globally unique across (a) multiple cores within a same croup and/or (b) cores that are spread across different groups and yet still provide relative indexing into an index aliasing table 302 as shown in FIG. 3, persistent (also known as static) indices can concurrently exist with relative indices across PPU and/or SPU index sets, in accordance with another illustrative embodiment. According to this exemplary embodiment, a CBEA system's PPU utilizes two distinct SPU core sets, each core set having four SPU's. Each of the four SPU's is only aware of other SPU's that belong to the same set. For exemplary purposes, assume that each SPU tracks 16 bytes of data for each SPU and PPU in its core set. In comparison, PPU tracks each SPU that it utilizes.

Figure 4:
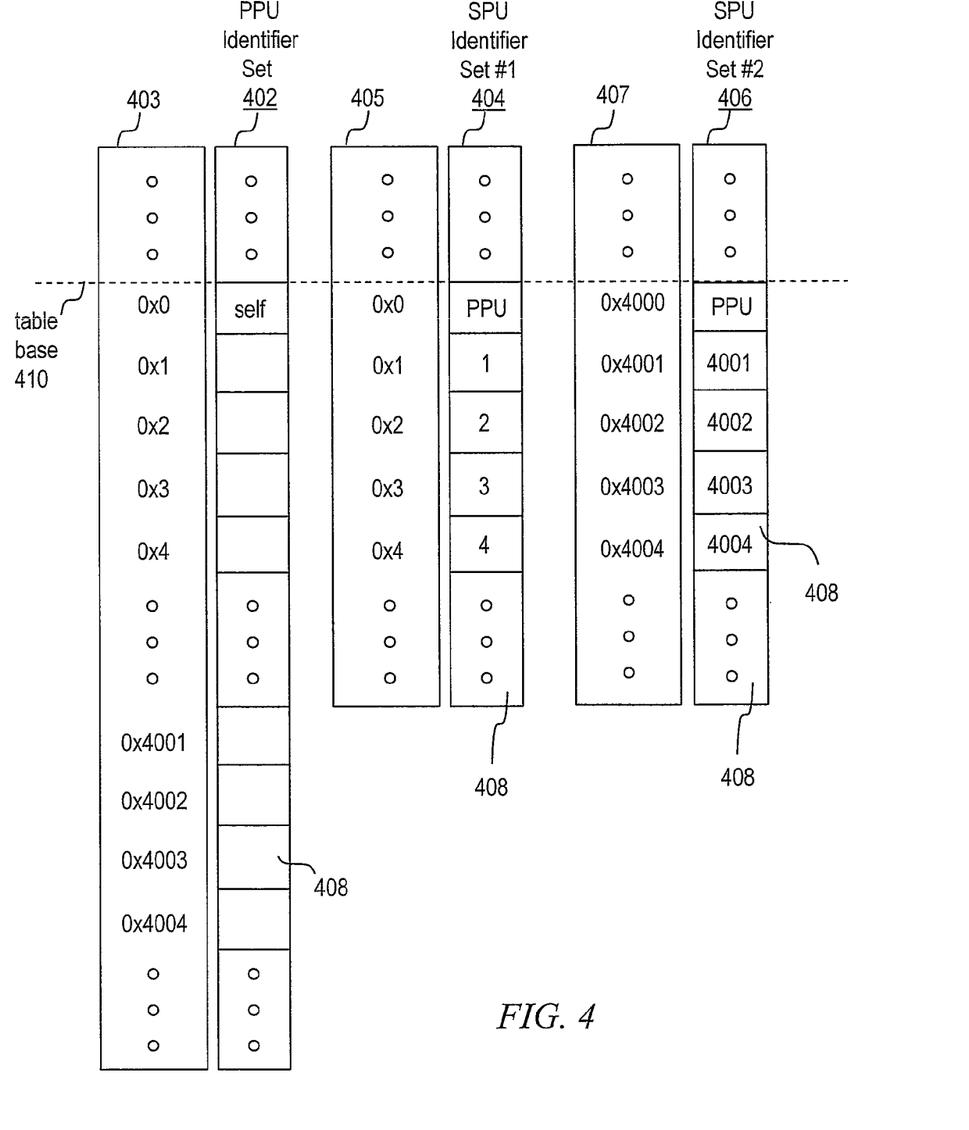
FIG. 4 depicts an exemplary identifier (ID) set for various processor units in accordance with an illustrative embodiment.

In view of the foregoing example, FIG. 4 depicts various exemplary identifier (ID) sets for a PPU (ID set 402) and two SPUs (ID sets 404 and 406), in accordance with an illustrative embodiment. According to FIG. 4, the ID sets are listed as the following:

PPU=0
SPU Set #1 ID={0x1, 0x2, 0x3, 0x4}
SPU Set #2 ID={0x4001, 0x4002, 0x4003, 0x4004}

PPU has a unique, but static, identifier for each SPU across all of the SPU core sets. Moreover, PPU and the SPUs employ the static identifier as a relative index in a lookup table. Each block 408 in ID sets 402, 404, and 406 depicts an address space of the PPU and SPU core sets. In addition, each address space 408 has a corresponding ID lookup table of IDs associated with the owning member. The ID lookup table is based at a predetermined location labeled with table base 410. It should be recognized table base 410 does not need to be the same for each address space as long as table base 410 is aligned at an address that is naturally aligned with the table element size. Members of each core set access table data for their associated members via the member's ID as an index from the table base 410. As stated earlier, PPU tracks all IDs, while each SPU only needs to track the PPU and SPUs in its own set. Moreover, the SPUs use the persistent PPU identifier of 0 for indexing as well. This approach provides the flexibility to support multiple, persistent IDs in addition to the set specific relative IDs as assigned by the host member.

As will be appreciated by one skilled in the art, the present invention may be embodied as a system, method, or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in any one or more computer readable medium(s) having computer usable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, device, or any suitable combination of the foregoing. More specific examples (a non-exhaustive list) of the computer readable storage medium would include the following: a portable computer diskette, a hard disk, a random access memory (RAM), a read-only memory (ROM), an erasable programmable read-only memory (EPROM or Flash memory), a portable compact disc read-only memory (CDROM), an optical storage device, a magnetic storage device, or any suitable combination of the foregoing. In the context of this document, a computer readable storage medium may be any tangible medium that can contain or store a program for use by or in connection with an instruction execution system, apparatus, or device.

A computer readable signal medium may include a propagated data signal with computer readable program code embodied therein, for example, in a baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Computer code embodied on a computer readable medium may be transmitted using any appropriate medium, including but not limited to wireless, wireline, optical fiber cable, radio frequency (RF), etc., or any suitable combination thereof.

Computer program code for carrying out operations for aspects of the present invention may be written in any combination of one or more programming languages, including an object oriented programming language such as Java™ language, Smalltalk™ language, C++, or the like, and conventional procedural programming languages, such as the "C" programming language or similar programming languages. The program code may execute entirely on the user's computer, partly on the user's computer, as a stand-alone software package, partly on the user's computer and partly on a remote computer, or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

The illustrative embodiments are described below with reference to flowchart illustrations and/or block diagrams of methods, apparatus (systems) and computer program products according to the illustrative embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions that implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus, or other devices to produce a computer implemented process such that the instructions which execute on the computer or other programmable apparatus provide processes for implementing the functions/acts specified in the flowchart and/or block diagram block or blocks.

Figure 5:
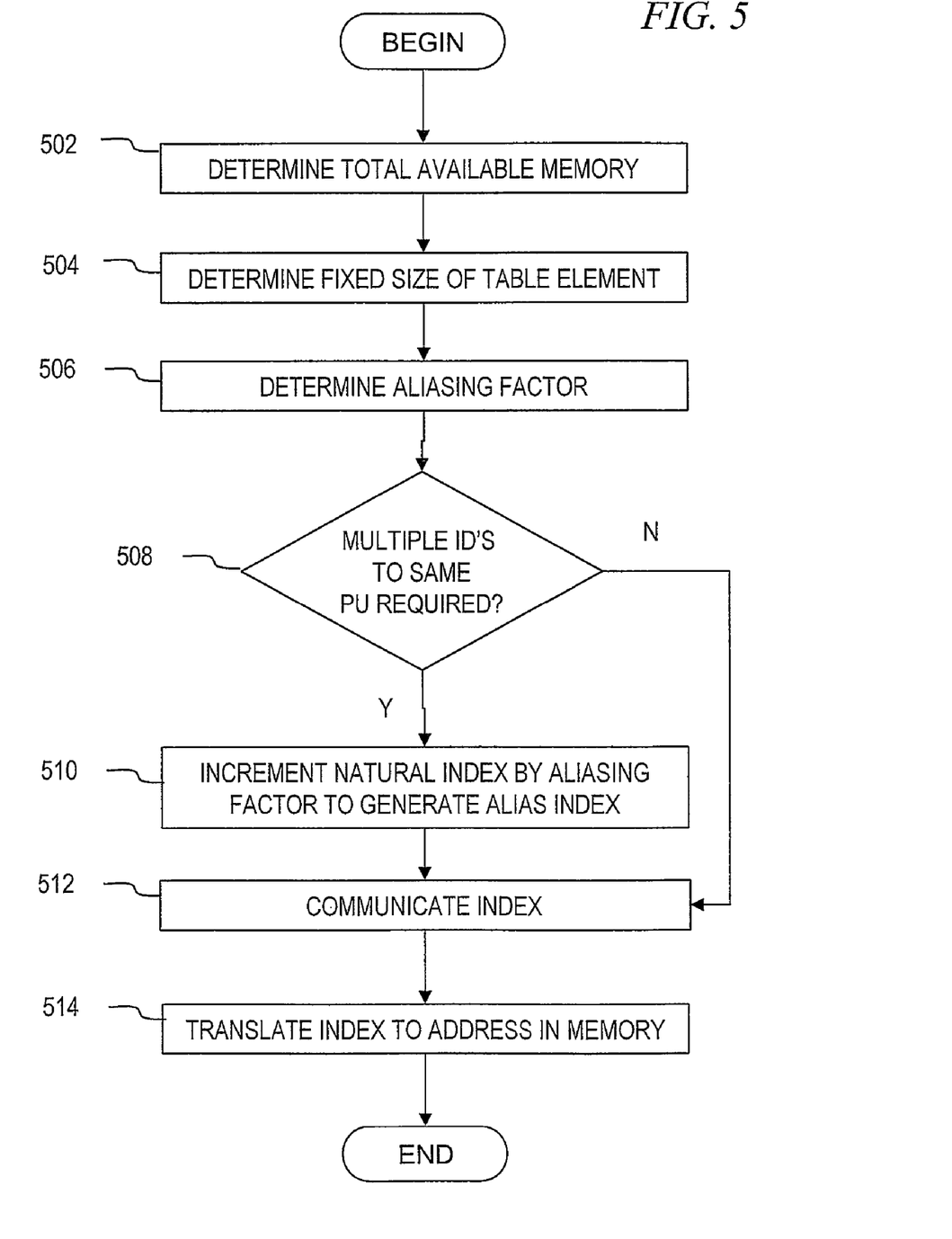
FIG. 5 depicts an example of the operation performed by Power PC® processor unit (PPU) of FIG. 1 in assigning efficiently referenced globally unique identifiers in accordance with an illustrative embodiment.

Referring now to FIG. 5, this figure provides a flowchart outlining example operations by a memory flow controller (MFC) 107, 108, 109, or 110 (FIG. 1) for assigning efficiently referenced globally unique identifiers in a multi-core environment in accordance with an illustrative embodiment. As the operation begins, PPU 133, 134, 135, or 136, via an application running on the PPU, determines a total memory size of the address space 200 (FIG. 2) of LS 112, 113, 114, or 115 (block 502). PPU 133, 134, 135, or 136, via an application running on the PPU, determines the fixed size of a table element of address lookup table within the total available memory of LS 112, 113, 114, or 115, respectively (block 504). While fixed in size, the data contained in the table element can be of any size and contains data pertaining to another SPU's identifier (ID). An aliasing factor is determined using PPU 133, 134, 135, or 136 by calculating the quotient of the total available memory from block 502 and the fixed size of said table element from block 504 (block 506). At decision block 508, PPU 133, 134, 135, or 136 determines whether more than one distinct identifier (ID) to a same processor unit (PU; e.g., PPU or SPU) is required. If PPU 133, 134, 135, or 136 determines that no aliasing is required in decision block 508, the process continues to block 512, where PPU 133, 134, 135, or 136 communicates the non-aliased index to its corresponding SPU 103, 104, 105, or 106. However, if PPU 133, 134, 135, or 136 determines whether more than one distinct identifier (ID) to a same processor unit (PU; e.g., PPU or SPU) is required, the method continues to block 510. According to block 510, PPU 133, 134, 135, or 136 increments a natural index to an address in memory by the aliasing factor determined in block 506. This incrementation of the natural index by the aliasing factor generates an index alias that PPU 133, 134, 135, or 136 communicates (block 512) to its corresponding SPU 103, 104, 105, or 106 for translating the alias index (or non-aliased index, if no aliasing is required) to an address, as depicted in block 514. From block 514, the operation terminates thereafter.

The flowchart in FIG. 5 illustrates the architecture, functionality, and operation of possible implementations of systems, methods and computer program products according to one embodiment of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in FIG. 5. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

As noted above, it should be appreciated that the illustrative embodiments may take the form of an entirely hardware embodiment, an entirely software embodiment or an embodiment containing both hardware and software elements. In one example embodiment, the mechanisms of the illustrative embodiments are implemented in software or program code, which includes but is not limited to firmware, resident software, microcode, etc.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including but not limited to keyboards, displays, pointing devices, etc.) can be coupled to the system either directly or through intervening I/O controllers. Network adapters may also be coupled to the system to enable the data processing system to become coupled to other data processing systems or remote printers or storage devices through intervening private or public networks. Modems, cable modems and Ethernet cards are just a few of the currently available types of network adapters.

The description of the present invention has been presented for purposes of illustration and description, and is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

What is claimed is:

1. A method, in a multi-core environment, for assigning a globally unique core identifier, the method comprising:
    determining, using a principal processor unit (PPU), an index alias corresponding to a natural index, wherein a synergistic processor unit (SPU), corresponding to said PPU, translates said natural index to a first address in a core's memory and the SPU translates said index alias to a second address in said core's memory, said determining said index alias includes:
        determining, using said PPU, a total available memory size of a local storage (LS) of a processor core, wherein said LS stores an address lookup table;
        determining, using said PPU, a fixed size of a table element of said address lookup table within said total available memory of LS;
        determining an aliasing factor using said PPU, wherein said aliasing factor is a quotient of said total available memory and said fixed size of said table element;
        incrementing, using said PPU, said natural index by said aliasing factor;
        communicating, using said PPU, said index alias to said SPU; and
    translating, using said PPU, said index alias to said second address, wherein said second address and said first address point to the same physical location in said core's memory.

2. The method of claim 1, further comprising: responsive to said second address exceeding a physical memory size, truncating said second address to a usable range of address space in systems that do not map an address space.

3. The method of claim 1, wherein said index alias is a relative index value and portable between different address spaces.

4. The method of claim 1, wherein said multi-core environment is a Cell Broadband Engine Architecture (CBEA).

5. The method of claim 1, further comprising assigning, using said PPU, a persistent globally unique core resource identifier across a plurality of core sets within a relative indexing mapping scheme that is specific to a particular core set.

6. The method of claim 1, further comprising, in response to increasing said total available memory size, increasing, by said PPU, said aliasing factor by a multiple of said aliasing factor.

7. A computer program product, comprising:
    a computer readable storage device having a computer readable program stored therein, wherein the computer readable program, when executed on a computing device, causes the computing device to:
        determine an index alias corresponding to a natural index, wherein said natural index translates to a first address in a core's memory and said index alias translates to a second address in said core's memory, said determining said index alias causes the computing device to:
            determine a total available memory size of a local storage (LS) of a processor core, wherein said LS stores an address lookup table;
            determine a fixed size of a table element of said address lookup table within said total available memory of LS;
            determine an aliasing factor, wherein said aliasing factor is a quotient of said total available memory and said fixed size of said table element; and
            increment said natural index by said aliasing factor; and
        translate said index alias to said second address, wherein said second address and said first address point to the same physical location in said core's memory.

8. The computer program product of claim 7, wherein the computer readable program further causes the computing device to, responsive to said second address exceeding a physical memory size, truncate said second address to a usable range of address space in systems that do not map an address space.

9. The computer program product of claim 7, wherein said index alias is a relative index value and portable between different address spaces.

10. The computer program product of claim 7, wherein said multi-core environment is a Cell Broadband Engine Architecture (CBEA).

11. The computer program product of claim 7, wherein the computer readable program further causes the computing device to, assign a persistent globally unique core resource identifier across a plurality of core sets within a relative indexing mapping scheme that is specific to a particular core set.

12. The computer program product of claim 7, wherein the computer readable program further causes the computing device to, in response to increasing said total available memory size, increasing said aliasing factor by a multiple of said aliasing factor.

13. An apparatus, comprising:
    a processor; and
    a memory coupled to said processor, wherein the memory comprises instructions which, when executed by said processor, cause said processor to:
        determine an index alias corresponding to a natural index, wherein said natural index translates to a first address in a core's memory and said index alias translates to a second address in said core's memory, wherein the instructions to determine said index alias causes the processor to:
            determine a total available memory size of a local storage (LS) of a processor core, wherein said LS stores an address lookup table;
            determine a fixed size of a table element of said address lookup table within said total available memory of LS;
            determine an aliasing factor, wherein said aliasing factor is a quotient of said total available memory and said fixed size of said table element; and
            increment said natural index by said aliasing factor; and
        translate said index alias to said second address, wherein said second address and said first address point to the same physical location in said core's memory.

14. The apparatus of claim 13, wherein the instructions further cause the computing device to, responsive to said second address exceeding a physical memory size, truncate said second address to a usable range of address space in systems that do not map an address space.

15. The apparatus of claim 13, wherein said index alias is a relative index value and portable between different address spaces.

16. The apparatus of claim 13, wherein said multi-core environment is a Cell Broadband Engine Architecture (CBEA).

17. The apparatus of claim 13, wherein the instructions further cause the computing device to assign a persistent globally unique core resource identifier across a plurality of core sets within a relative indexing mapping scheme that is specific to a particular core set.

18. The apparatus of claim 13, wherein the instructions further cause the computing device to, in response to increasing said total available memory size, increasing said aliasing factor by a multiple of said aliasing factor.

\* \* \* \* \*